Patented Mar. 19, 1946

2,396,669

UNITED STATES PATENT OFFICE 2,396,669

TREATMENT OF BITUMINOUS MATERIAL

Laszlo Auer, South Orange, N. J.

No Drawing. Application October 12, 1942,
Serial No. 461,788

10 Claims. (Cl. 106—274)

GENERAL FIELD OF INVENTION AND STATEMENT OF OBJECTS

This invention relates to treatment of bituminous materials and products with modifying agents in order to alter the physical and other properties and characteristics thereof. The present application is a continuation-in-part of my copending application Serial No. 318,650, filed February 12, 1940, now Patent 2,298,270, issued October 13, 1942.

As is mentioned in my copending application above identified and also in others elsewhere referred to herein, I believe bituminous products to be organic isocolloids, i. e., colloidal systems in which the dispersed phase and the dispersion medium are both of the same chemical composition, though present in different physical states.

Although there are many classifications, groups and types of bituminous products, they all have certain characteristics in common and I believe the colloidal system of all of them is subject to modification by the use of certain modifying agents identified hereinafter.

In general, bituminous products are such materials as asphalt and asphalt oils, tar and tar oils, goudron or petroleum distillation residues, pitches, etc.

Certain of the bituminous materials are natural products, for instance, asphalts, mineral rubber, and gilsonite (sometimes considered as a type of asphalt). On the other hand, other bituminous materials are by-products, notably pitches such as residues of petroleum, coal tar, fatty acid distillation (goudrons) and rosin distillation. Coal tars themselves are bituminous by-products capable of treatment in accordance with the invention.

All of the bituminous materials comprise hydrocarbons in major proportion, although other constituents may be present.

According to one classification, various of these materials are grouped together as "bitumens" and others as "pyrobitumens."

In this classification the term bitumen is applied to various substances composed principally of hydrocarbons and being substantially free from oxygenated bodies, the materials being sometimes associated with mineral matter, the non-mineral constituents being fusible and largely soluble in carbon disulphide, yielding water insoluble sulphonation products.

The term pyrobitumen, according to the classification just above, comprehends hydrocarbon materials, which may or may not contain oxygenated bodies, these also sometimes being associated with mineral matter, and the non-mineral constituents being fusible and relatively insoluble in carbon disulphide. The expression pyrobitumen implies that the material when subjected to heat or fire will generate, or become transformed into materials resembling bitumens, especially with respect to their physical and solubility characteristics.

A more complete classification of certain of the bituminous materials is as follows:

A. Bitumens
    1. Petroleums
        Non-asphaltic petroleum
        Semi-asphaltic petroleum
        Asphaltic petroleum
    2. Native mineral waxes
        Ozokerite (ceresine when refined)
        Montan wax
    3. Native asphalts
        Pure or fairly pure
        Associated with mineral matter
    4. Asphaltites
        Gilsonite
        Glance pitch
        Grahamite B. Pyrobitumens
    1. Asphaltic pyrobitumens
        Elaterite
        Wurtzilite
        Albertite
        Impsonite
        Asphaltic pyrobituminous shales
    2. Non-asphaltic pyrobitumens
        Peat
        Lignite
        Bituminous coal
        Anthracite coal
        Lignitic and coal shales C. Pyrogenous distillates
    1. Pyrogenous waxes
        Petroleum paraffin
        Peat paraffin
        Lignite paraffin
        Shale paraffin
    2. Tars
        Oil-gas tar
        Water-gas tar
        Pine tar
        Hardwood tar
        Peat tar
        Lignite tar
        Shale tar
        Gas-works-coal tar
        Coke-oven-coal tar
        Blast-furnace-coal tar
        Producer-gas-coal tar
        Bone tar D. Pyrogenous residues
1. Pyrogenous asphalts
Residual oils
Pressure tars
Blown petroleum asphalts
Residual asphalts
Sludge asphalts
Wurtzilite asphalts
2. Pitches
Oil-gas-tar pitch
Water-gas-tar pitch
Wood-tar pitch
Peat-tar pitch
Lignite-tar pitch
Shale-tar pitch
Gas-works-coal-tar pitch
Coke-oven-coal-tar pitch
Blast-furnace-coal-tar pitch
Producer-gas-coal-tar pitch
Bone-tar pitch
Rosin pitch
Fatty acid pitch It will be understood that in the case of pyrobitumens, their bituminous content must first be isolated or separated before treatment in accordance with this invention. More specifically, liquid or fusible bituminous products can be advantageously treated by my process and the presence of unsaturated compounds and acidic ingredients (showing, for instance, iodine and acid numbers) are particularly adaptable to treatment.

Many of the foregoing materials have commercial uses in a number of fields, although many others are commonly considered as waste products. According to the invention, it is possible to so modify the various materials as to improve the characteristics of those now in use, and even to so alter the characteristics of many which have not heretofore been employed commercially, thereby making possible use of such "waste" materials for various purposes.

For example, it is possible according to the invention to alter the physical consistency of the materials, for instance, to increase the fusion or melting point and also increase the toughness of asphaltic materials and also of other bituminous products. The nature of certain modifications brought about in accordance with the invention will appear more fully hereinafter from an analysis of examples given.

Being organic isocolloids, I believe that the colloidal system of these various bituminous materials, may be influenced by the employment of modifying agents. Such agents, examples of which are given hereinafter, are preferably thoroughly dispersed in the material being treated and for this purpose, I prefer to employ heat in ranges set out more fully herebelow. However, before considering the various factors of the treatment process itself, reference is here made to the modifying agents contemplated for use in accordance with the invention.

THE MODIFYING AGENT

According to the invention, the modifying agents employed are polar compounds in general, especially acidic polar compounds although certain others are also usable as will further appear. By polar compounds I mean compounds having polarity in the molecule, thus including electrolytes. Examples are given below.

Polar compounds are of many different classes, many of which are defined in my copending application above mentioned, and also in others referred to hereinafter. The type of modification secured by various groups of modifying agents and even by individual agents, may be quite different, many agents and groups producing results which are quite distinctive, although as before mentioned, I believe the polar compounds are all capable of influencing the colloidal system of the bituminous products in various of the respects already mentioned and also in other respects.

According to one general classification of polar compounds, the modifying agents may be grouped as follows:

Metal salts of inorganic acids
Metal salts of organic acids
Inorganic acids
Organic acids
Metallo-organic compounds
Metal alcoholates
Aryl-metal compounds
Organic esters of inorganic acids
Inorganic salts of organic bases
Organic esters Amines also constitute a useful class, particularly the poly-amines, for instance, diamines.

Many of the compounds falling in certain classes mentioned above are also of the type which I have termed "two-radical" compounds, i. e., compounds having within the molecule an acidic inorganic residue and an organic residue. By an acidic inorganic residue I mean a residue capable of yielding an inorganic acid upon the addition of one or more hydrogen atoms, OH groups, or water molecules, or upon the application of heat.

Such two radical type compounds may desirably contain a sulpho-, halo- or nitro-group.

Typical examples of certain of the foregoing classifications are given just below:

*Metal salts of inorganic acids*

(Formed by various combinations of the following:)

| Cations: | Anions: |
|---|---|
| Ammonium | Chloride |
| Lithium | Bromide |
| Sodium | Iodide |
| Barium | Carbonate—Bicarbonate |
| Calcium | Sulphate |
| Zinc | Bisulphate |
| Iron | Sulphite |
| Cobalt | Bisulphite |
| Lead | Nitrate |
| Manganese | Nitrite |
| Copper | Borate |
|  | Phosphate |

*Metal salts of organic acids*

(Formed by various combinations of the following:)

| Cations: | Anions: |
|---|---|
| Ammonium | Formate |
| Lithium | Acetate |
| Sodium | Oxalate |
| Barium | Citrate |
| Calcium | Salicylate |
| Zinc | Phthalate |
| Iron | Maleate |
| Cobalt | Naphthol-sulphonates |
| Lead |  |
| Manganese |  |
| Copper |  |

*Salts of organic amines*

Diphenylamine trichloracetate
Diphenylamine hydrochloride
Diphenylamine hydrobromide
m-Nitroaniline hydrochloride
Trichloroaniline hydrochloride
Diphenyl amine sulphate
Diaminodiphenyl sulphate
Aniline sulphate
Amino-azo-benzene sulphate
4:4' diamino-diphenyl sulphide
Aniline hydrochloride

*Inorganic acids*

Carbonic acid
Hydrochloric acid
Hydrobromic acid
Hydriodic acid
Sulphuric acid
Sulphurous acid
Hydrosulphurous acid
Hydrosulphuric acid
Thiosulphuric acid
Nitric acid
Nitrous acid
Boric acid
Phosphoric acid
Hydrocyanic
Thiocyanic
Chlorsulphonic

*Organic acids*

Tartaric acid
Maleic acid
Acetic acid
Oxalic acid
Salicylic acid
Phthalic acid
Citric acid
Trichloracetic acid
Naphthenic acids

*Metal alcoholates*

Sodium amylate

*Two-radical compounds*

A. Containing nitro-group
   Nitrobenzene
   o-Nitrophenol
   p-Nitrophenol
   Dinitrobenzene
   Nitro-chloro-benzene
   Dinitro-chlorobenzene
   Dinitroaniline
   p-Nitro-acetanilide
   Nitrocresyl carbonate
   m-Nitroaniline hydrochloride
   Ethyl thioether of 2-nitrobenzene
   Ethyl thioether of 2:4 dinitrobenzene
   Ethyl thioether of nitro-aminobenzene
   2:4-dinitrobenzene
   Nitro-aminobenzene B. Containing sulpho-group
   Benzene sulphonic acid
   p-Toluene sulphonic acid
   2:5 dichlorobenbene sulphonic acid
   m-Xylidine sulphonic acid
   p-Toluidine-m-sulphonic acid
   Naphthalene 2:6 sulphonic acid
   Beta-naphthol 1:5 sulphonic acid
   Beta-naphthol 3:6:8 sulphonic acid
   Beta-naphthylamine 3:6:8 trisulphonic acid
   2:1 naphthylamine sulphonic acid
   2:6 naphthylamine sulphonic acid
   2-phenylamine - 8 - naphthol- 6 - sulphonic acid
   Methyl-p-toluene sulphonate
   Ethyl chlorosulphonate
   Benzene sulphonyl chloride
   p-Toluene sulphonyl chloride
   Naphthalene-1-sulphonyl chloride
   Dimethyl sulphate
   Diaminodihydroxy anthraquinone disulphonic acid C. Containing halo-group
   o-Dichlorobenzene
   p-Dichlorobenzene
   Trichlorobenzene
   Naphthalene tetrachloride
   Naphthalene trichloride
   Naphthalene hexachloride
   Naphthalene monochloride
   Nitro-chlorobenzenes, ortho, meta and para
   Nitro-dichlorobenzenes
   Chloro-dinitrobenzenes
   Monochlorobenzene
   Chlorinated diphenyl
   Pinene hydrochloride
   4-chloro-o-anisidine
   p-Nitro-chloro-benzene
   Triphenyl-chloro-methane
   Benzyl chloride
   Benzoyl chloride
   Acetyl chloride
   Acetyl bromide
   Phthaloyl chloride
   Trichloroacetic acid
   Monochloroacetic acid
   Chloral hydrate
   Iodoform

*Organic esters of inorganic acids*

Triphenyl phosphate
Tricresyl phosphate and other alkylphenyl phosphates
Nitrocresyl carbonate
Ethyl chlorosulphonate
Dimethyl sulphate

*Peroxides*

Barium peroxide
Magnesium peroxide
Benzoyl peroxide

*Amines*

Benzidine
Diphenyl-amine
Alpha-naphthyl-amine

I have found that certain groups of modifying agents are particularly effective in the treatment of bituminous materials, for instance, organic sulphonic acids, organic sulpho chlorides, amines, and metal sulphides, sulphites and carbonates.

Hereinafter examples are given of the treatment with modifying agents selected from various of the classes above discussed.

TREATMENT CONDITIONS

Although the treatment conditions may be varied in accordance with a number of factors, such as the particular material being treated, the treating agent selected and the characteristics desired, in general, the treatment conditions should conform with the following.

With respect to temperature, it is first noted that while some modification may be brought about merely by dispersing the modifying agent in the bituminous material at normal room temperature, in general, the treatment temperature should be above about 200° C., but not above the point at which appreciable destructive distillation or decomposition occurs, or not above the flash point of the material. Usually it is found, for instance with asphalts, pitches and the like, that temperatures between about 200° C. and about 320° C. are effective.

The quantity of modifying agent employed will also depend somewhat on the material being treated, on the modifying agent selected, and on the particular characteristics desired. For various purposes a fairly wide range is usable, for instance, from an appreciable trace, such as .1% or .5% up to about 10%. Ordinarily not more than about 5% is required, and many of the modifying agents are effective in the neighborhood of about 1%.

The duration of the heating will similarly depend on the materials used and the results desired. Usually the heating should be continued at least until thorough dispersion of the treating agent is obtained. Ordinarily it is found that treatment for a period of at least 30 minutes is required and frequently for several hours, for instance up to 10 or 15 hours.

In general, increase in temperature or duration of heating, and sometimes also in percentage of modifying agent, tends to promote the reaction and/or produce a more extensive modification.

The nature of the atmosphere in contact with the reaction mass will influence the modification which occurs. The reaction may be carried out either in the presence or in the absence of air, depending upon the results desired, although frequently no special precaution need be taken in this regard and the treatment may be carried out in an open vessel. Variation in pressure, either above or below atmospheric pressure, may also influence the reaction in some cases.

In situations where it is desired to exclude air, this may be accomplished by employing vacuum or by introducing some suitable gas into the reaction vessel to serve as a blanket on the surface of the batch. Gases suitable for this purpose are nitrogen, $CO_2$, $SO_2$, $H_2S$, amongst others. Certain of these gases ($SO_2$ and $H_2S$) may also be bubbled through the reaction mass, in which event secondary reaction may take place.

Various combinations of modifying agents above mentioned, as well as disclosed in my copending applications herein identified, may be employed for special purposes, and in addition, the modifying agent may be produced in situ, by introducing materials which will react under the conditions of the treatment to produce the modifying agent desired.

Light treatment and wave treatment of various types also influence the reaction, for instance, treatment with visible light, ultra violet light or with electrical potential differences. Irradiation with oscillating energy of various wave lengths, X-rays, etc., may also be used.

Treatment of the modified bituminous materials with sulphur may be employed to advantage, in order to secure sulphurized products.

Certain of the materials, for instance, asphaltic materials, are also advantageously vulcanized, and in this connection it is noted that I have found improved results to follow from treatment of an asphaltic material with certain modifying agents, where the material is subsequently compounded with rubber. Such materials are also useful in the making of articles such as battery boxes.

Other uses for the modified bituminous materials are for instance, molded plastic articles, coating materials such as paints and varnishes, roofing compositions, base materials for road making, etc.

EXAMPLES

A series of comparative experiments were conducted in order to indicate modifications secured from a number of different modifying agents which are typical of groups. In this series an asphalt mixture was treated (Barber Asphalt Company material identified as G460, the material being suitable for use in making battery boxes).

The experiments of Table I were carried out in a one liter open container, the charge being 300 grams. No mechanical agitation was employed though hand stirring was adopted to initially distribute the modifying agent throughout the asphalt.

All of the experiments were heated and maintained at the treatment temperature for five hours, the treatment temperature being different with different experiments.

Various different modifying agents were employed in different percentages, as will appear from the foregoing table. The results of this comparative series are indicated in Table No. I just below.

In this series some oxidation may have occurred, in view of the small size of the batches, and because the heating was carried out in open containers. This oxidation may be in part responsible for the increase in melting points.

All temperatures are given in degrees centigrade.

Table No. I

| Ex. No. | Agent | Percent | Temp. | Softening point (ball and ring method) | Size of batch |
|---|---|---|---|---|---|
|  |  |  | Degrees | Degrees | Grams |
| 1 | Benzidine base | 1 | 200 | 124 | 300 |
| 2 | ----do---- | 1 | 250 | 140 | 300 |
| 3 | ----do---- | 1 | 300 | 160 | 300 |
| 4 | ----do---- | 5 | 300 | 158 | 300 |
| 5 | p-Toluene-sulphochloride. | .5 | 300 | 156 | 300 |
| 6 | ----do---- | 1 | 300 | 155 | 300 |
| 7 | ----do---- | 2 | 300 | 143 | 300 |
| 8 | p-Toluene-sulphonic acid. | .5 | 300 | 158 | 300 |
| 9 | ----do---- | 1 | 300 | 169 | 300 |
| 10 | ----do---- | 2 | 300 | 137 | 300 |
| 11 | Sodium bisulphite | 5 | 250 | 145 | 300 |
| 12 | ----do---- | 5 | 300 | 156 | 300 |
| A | (Asphalt without any treatment). |  |  | 119.5 |  |
| B | (Heated without agent). |  | 300 | 149 | 300 |

A second series in the same containers and under the same reaction conditions, except for the following changes:

(1) 800 gram batches were used, except where the batch had to be reduced to 500 grams on account of foaming during the reaction.

(2) The containers, instead of being open, were covered, and (3) $CO_2$ blanket was used.

*Table No. II*

| Ex. No. | Agent | Per cent | Temp. | Softening point (ball and ring method) | Size of batch |
|---|---|---|---|---|---|
| | | | Degrees | Degrees | Grams |
| 13 | Benzidine base | 1 | 300 | 137 | 800 |
| 14 | ___do___ | 5 | 300 | 137.5 | 800 |
| 15 | p-Toluene-sulphochloride | .5 | 300 | 105 | 800 |
| 16 | ___do___ | 2 | 300 | 91½ | 500 |
| 17 | ___do___ | 5 | 300 | 144 | 500 |
| 18 | p-Toluene-sulphonic acid | .5 | 300 | 98 | 800 |
| 19 | ___do___ | 2 | 300 | 104 | 500 |
| 20 | ___do___ | 5 | 300 | 126 | 500 |
| 21 | Sodium bisulphite | 5 | 300 | 119 | 800 |
| 22 | ___do___ | 1 | 300 | 113 | 800 |
| A | (Asphalt without any treatment) | | | 119.5 | |
| C | (Heated without agent) | | 300 | 99 | 800 |

From the above tables several effects of the modifying treatment will at once be apparent. For instance, increase in temperature, in general, increases the effectiveness of the reaction and the extent of modification.

surprising to note that exceptionally small quantities of sulphur and very short vulcanizing periods, yield extensive changes when the materials have been previously treated with modifying agents according to the present invention.

*Example No. 34*

300 gms. Goudron tar:  
  2½% barium peroxide } Vacuum applied  
  2½% sodium bisulphite } Press. 24-25 inches The pasty mass melts on heating and froths vigorously. In a short time thickening begins and in 65 minutes from starting it comes on temperature (230-240° C.) and in two hours a sample is taken. It is then reheated for a further hour and after sampling is poured out yielding a soft, black, elastic solid.

*Example No. 35*

500 gms. Goudron tar:  
  5% sodium bisulphite (to start)

In this the object was to obtain a hard, stiff, solid which melted between 50 and 130° C.

The conditions of experiment are best followed by the following tabular summary:

| Times | Temp. | Notes | Product |
|---|---|---|---|
| | °C. | | |
| 0 | 26 | Start—froths on heating | Thick viscous oil. |
| 2 hours | 210 | Mixture frothing badly and some frothings in side tube dist. flask, therefore, stopped to clean side tube. | |
| 2½ hours | 130 | Restart | |
| 2¾ hours | 254 | Bad frothing | |
| 3¼ hours | 258 | Frothing—stopped heating and a sample poured into a tin | Stiff black solid (sample 1). |
| 3½ hours | 160 | Restart | |
| 4¼ hours | 290 | Stopped and shut down for night | |
| *On re-starting* | | | |
| 4¼ hours | 28 | Restart | |
| 4¾ hours | 284 | Slight froth | |
| 5½ hours | 262 | Slight froth—stopped heating and a sample poured into a tin | Stiff black solid softer than sample 1 (sample 2). |
| 5¼ hours | 230 | Restart | |
| 5 hours, 35 minutes | 290 | Stopped and a further 2% modifying agent added (making total percent to 7%). | |
| 7 hours | 290 | Bad frothing which had occurred again has now gradually subsided | |
| 7 hours, 40 minutes | 294 | Stopped for a sample | Hard stiff solid (sample 3). |
| 7 hours, 45 minutes | 200 | Restart | |
| 8 hours, 45 minutes | 272 | Stopped and final product poured off | Brittle black solid. |

No distillation occurred during the experiment.
Product becomes plastic at 52° C. and melts to viscous liquid at 120° C.
Original becomes plastic at 40° C. and melts to viscous liquid at 100° C.

Moreover, it will be noted that in general the modification results in a raising of the softening point of the material. The softening point of blank B should be particularly noted and compared with the numbered examples.

Some of the products of the examples in Tables I and II were aftertreated with sulphur to further increase their melting point and toughness. The results are shown in Table III below.

*Table No. III*

| Ex. No. | After treatment of Example No.— | Sulphur | Vulc. temp. | Vulc. time | Softening point after vulc.[1] | Size of batch |
|---|---|---|---|---|---|---|
| | | Per cent | | Minutes | | Grams |
| 23 | 4 | 5 | 220 | 5 | 187 | 100 |
| 24 | 6 | 5 | 200 | 5 | 193 | 100 |
| 25 | 12 | 5 | 200–250 | 3 | 195 | 100 |
| 26 | 21 | 1 | 235 | 10 | 125 | 150 |
| 27 | 21 | 2 | 290 | 2 | 132 | 150 |
| 28 | 21 | 5 | 265 | 13 | 147 | 150 |
| 29 | 21 | 2 | 280 | 15 | 137 | 150 |
| 30 | 22 | 1 | 230 | 10 | 119 | 150 |
| 31 | 22 | 2 | 290 | 2 | 137 | 150 |
| 32 | 22 | 3 | 250 | 28 | 142 | 150 |
| 33 | 22 | 2 | 280 | 15 | 134 | 150 |

[1] Ball and ring method.

Whereas sulphur treatment (vulcanization) of bituminous products is known in the art, it is

*Example 36*

300 gms. Goudron tar: } Vacuum applied  
  5% magnesium peroxide

The mixture was heated in vacuum, the pressure varying between 20 and 24 inches mercury. The mixture reached 284° C. after 35 minutes' heating, when a slight froth was present and some distillation began. After being kept at 290–304° C. for 1 hour, the product had gone solid. The solidification took place gradually during that period. The heating was continued for a further ¼ hour, when the product began to char and the heating was therefore stopped.

*Product.*—Black rather brittle solid.

N. B.:
  (1) To remove the product from the flask it was necessary to break the flask, as the product failed to melt even at 320° C.
  (2) A small piece of the product, placed in a tin lid and heated over a Bunsen flame, did, however, finally melt.
  (3) A sample of the above was heated in a test tube with a thermometer inside. The following observations being taken:
    Mass becomes plastic at 90° C.
    Mass becomes a thick viscous liquid at 230° C.

Example 37

100 grams of goudron, together with 5% of sodium bisulphite, and 1% of barium peroxide and 3% of acetic acid were heated together above the melting point of the goudron. When cooled down to room temperature, the mass displayed considerable elasticity as compared with the starting material, and in addition, had a higher melting point than the starting material. When mixed with fillers in hot condition, the mass displayed great binding force.

Various of the foregoing and other variations in treatment may be employed, as is mentioned in my copending application above identified. Such supplemental matters need not be considered in detail herein, since reference may be made for that purpose to said copending applications, and also to certain other prior applications mentioned herebelow, all of which discloses certain features in common with the present application—to wit, Serial No. 359,425 (now Patent No. 2,213,944); Serial No. 446,172 (now Patent 2,213,943); Serial No. 446,170 (now Patent No. 2,234,949); and Serial No. 143,786 (now Patent No. 2,189,772).

Some of the modifying agents may act as dissolution promoting agents, as described in various of my prior applications and also in my issued Patent No. 2,293,038.

I claim:

1. A process for modifying the properties of bituminous materials, which process comprises incorporation in the bituminous material of more than 1% and up to 10% of an organic compound which is a member of the class consisting of benzidine, diphenylamine and alpha-naphthylamine, and heating the mixture at a temperature which is at least 250° C. and is below the decomposition or distillation point of the major portion of the material undergoing treatment for at least half an hour.

2. A process in accordance with claim 1 in which the bituminous material is an asphaltic material.

3. A process in accordance with claim 1 in which the bituminous material is asphalt.

4. A process in accordance with claim 1 in which the bituminous material is a fatty acid pitch.

5. A process in accordance with claim 1 in which the bituminous material is a pitch.

6. A process in accordance with claim 1 in which the treated material is subsequently vulcanized.

7. A process in accordance with claim 1 in which the organic compound is benzidine.

8. A modified asphaltic material having dispersed therein more than 1% and up to about 10% of an organic compound which is a member of the class consisting of benzidine, diphenylamine and alpha-naphthylamine, said material having increased fusion point, as compared with the same material unmodified, said increased fusion point being obtained by the aid of heating to at least 250° C. for at least half an hour.

9. A process in accordance with claim 1 in which the organic compound is diphenylamine.

10. A process in accordance with claim 1 in which the organic compound is alpha-naphthylamine.

LASZLO AUER.